United States Patent
Petersen et al.

(10) Patent No.: US 8,135,982 B2
(45) Date of Patent: Mar. 13, 2012

(54) PARALLEL MULTIPLEX STORAGE SYSTEMS

(75) Inventors: David B. Petersen, Great Falls, VA (US); Gail A. Spear, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 58 days.

(21) Appl. No.: 12/729,389

(22) Filed: Mar. 23, 2010

(65) Prior Publication Data

US 2011/0239040 A1 Sep. 29, 2011

(51) Int. Cl.
*G06F 11/00* (2006.01)
(52) U.S. Cl. .......................... 714/6.1; 714/11
(58) Field of Classification Search .............. 714/6.1, 714/6.23, 6.3, 6.31, 6.32, 10–13
See application file for complete search history.

(56) References Cited

U.S. PATENT DOCUMENTS

| | | | |
|---|---|---|---|
| 6,578,158 B1 * | 6/2003 | Deitz et al. ....................... | 714/11 |
| 6,973,586 B2 | 12/2005 | Petersen et al. | |
| 7,571,292 B2 | 8/2009 | McClure | |
| 2003/0018513 A1 * | 1/2003 | Hoffman et al. ................ | 705/10 |
| 2007/0165549 A1 | 7/2007 | Surek et al. | |
| 2009/0037677 A1 * | 2/2009 | Coronado et al. ............ | 711/162 |

* cited by examiner

*Primary Examiner* — Dieu-Minh Le
(74) *Attorney, Agent, or Firm* — Cantor Colburn LLP; William A. Kinnaman, Jr.

(57) ABSTRACT

A method for controlling a system includes receiving an indication that an operation has failed in a secondary storage device, suspending data operations sent to the secondary data storage device from a primary storage device, determining a failure policy set by a user, and initiating a first policy responsive to determining that the first policy is active, the first policy including sending a status query to the secondary storage device, determining whether a response has been received from the secondary storage device, determining whether the response indicates a failure of the secondary storage device responsive to determining that the response has been received from the secondary storage device, and continuing processing tasks on the server and data operations on the primary storage device responsive to determining that the response indicates a failure of the secondary storage device.

20 Claims, 4 Drawing Sheets

PARALLEL MULTIPLEX STORAGE SYSTEMS

BACKGROUND

Parallel multiplex storage systems may include a servers and data storage devices in a variety of locations. For example, a first location may include a server connected to a data storage device, and a second location may include a similar arrangement. The data storage devices may be paired and synchronized such that data written to a storage device in the first location is saved in the paired data storage device. This arrangement allows applications and functions run in the first location to be quickly transferred to the second location if the systems in the first location are disabled.

BRIEF SUMMARY

According to one embodiment of the present invention, a method for controlling a data system containing a server, a primary data storage device and a secondary data storage device includes receiving a failure indication indicating that a data operation has failed in the secondary data storage device, suspending sending of data operations to the secondary data storage device from a primary data storage device, determining a failure policy set by a user, and initiating a first policy responsive to determining that the user has set the first policy, the first policy including determining whether the failure indication indicates a failure of the primary data storage device, sending a status query to the secondary data storage device responsive to determining that the failure indication does not indicate a failure of the primary data storage device, determining whether a response to the status query has been received from the secondary data storage device, determining whether the response to the status query indicates a failure of the secondary data storage device responsive to determining that the response to the status query has been received from the secondary data storage device, and continuing processing tasks on the server and data operations on the primary data storage device responsive to determining that the response to the status query indicates a failure of the secondary data storage device.

According to another embodiment of the present invention, a data system includes a primary data storage device, a secondary data storage device communicatively linked to the primary data storage device and a processor communicatively linked to the primary data storage device, the processor operative to receive an indication that a data operation has failed in the secondary data storage device, suspend data operations sent to the secondary data storage device from a primary data storage device, determine a failure policy set by a user, and initiate a first policy responsive to determining that the user has set the first policy, the first policy including determining whether the failure indication indicates a failure of the primary data storage device, sending a status query to the secondary data storage device responsive to determining that the failure indication does not indicate a failure of the primary data storage device, determining whether a response to the status query has been received from the secondary data storage device, determining whether the response to the status query indicates a failure of the secondary data storage device responsive to determining that the response to the status query has been received from the secondary data storage device, and continuing processing tasks on a server and data operations on the primary data storage device responsive to determining that the response to the status query indicates a failure of the secondary data storage device.

According to yet another embodiment of the present invention, a computer readable medium for storing instructions including the steps of receiving an indication that a data operation has failed in a primary data storage device, suspending data operations sent to the primary data storage device from a secondary data storage device, determining a failure policy set by a user, and initiating a first policy responsive to determining that the user has set the first policy, the first policy including determining whether the failure indication indicates a failure of the secondary data storage device, sending a status query to the primary data storage device responsive to determining that the failure indication does not indicate a failure of the secondary data storage device, determining whether a response to the status query has been received from the primary data storage device, determining whether the response to the status query indicates a failure of the primary data storage device responsive to determining that the response to the status query has been received from the primary data storage device, and continuing processing tasks on the server and data operations on the secondary data storage device responsive to determining that the response to the status query indicates a failure of the primary data storage device.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1:
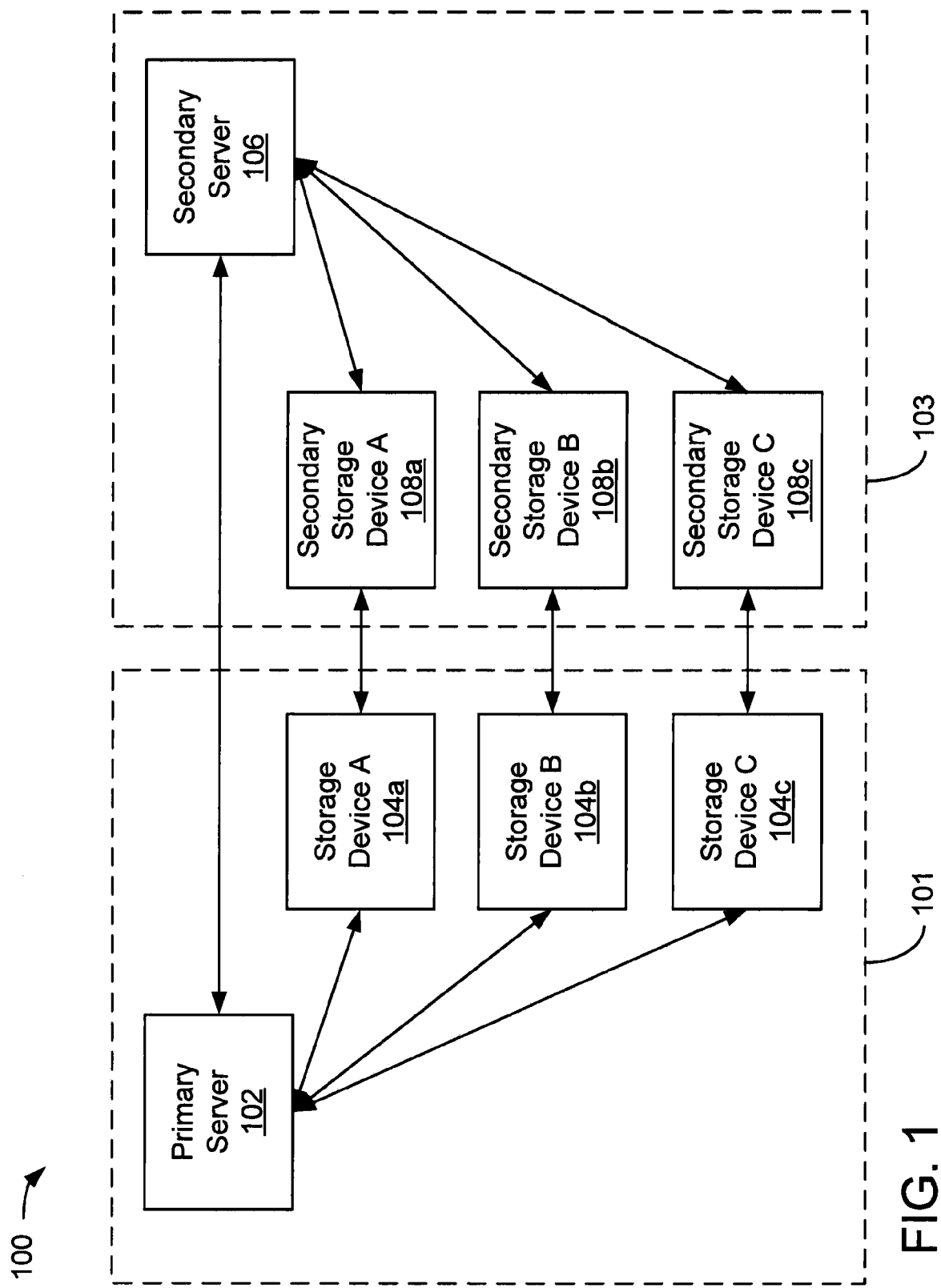
FIG. 1 illustrates an exemplary embodiment of a system.

FIG. 1 illustrates an exemplary embodiment of a system 100. The system 100 includes a primary location 101 that includes a primary server 102 such as, for example, one or more processors and associated hardware communicatively connected to storage devices 104 (storage devices A-C, 104a-104c). The storage devices 104, may include for example, a memory control unit processor, and data storage devices, which may include any type of memory devices such as, for example, hard disks, removable media, or solid state memory devices. A secondary location 103 includes a secondary server 106 that is communicatively connected to secondary storage devices 108 (secondary storage devices A-C, 108a-108c). In the illustrated embodiment, the primary server 102 and the secondary server 106 are communicatively connected. Though the primary server 102 is shown in the primary location 101, the secondary server 106 may include hardware that is communicatively linked to the primary server 102 and located in an alternate location, including the secondary location 103. Thus, the processing duties of the servers 102 and 106 may be performed by any number of servers in a variety of locations via a communicative link such as, for example, a communications network.

Figure 2:
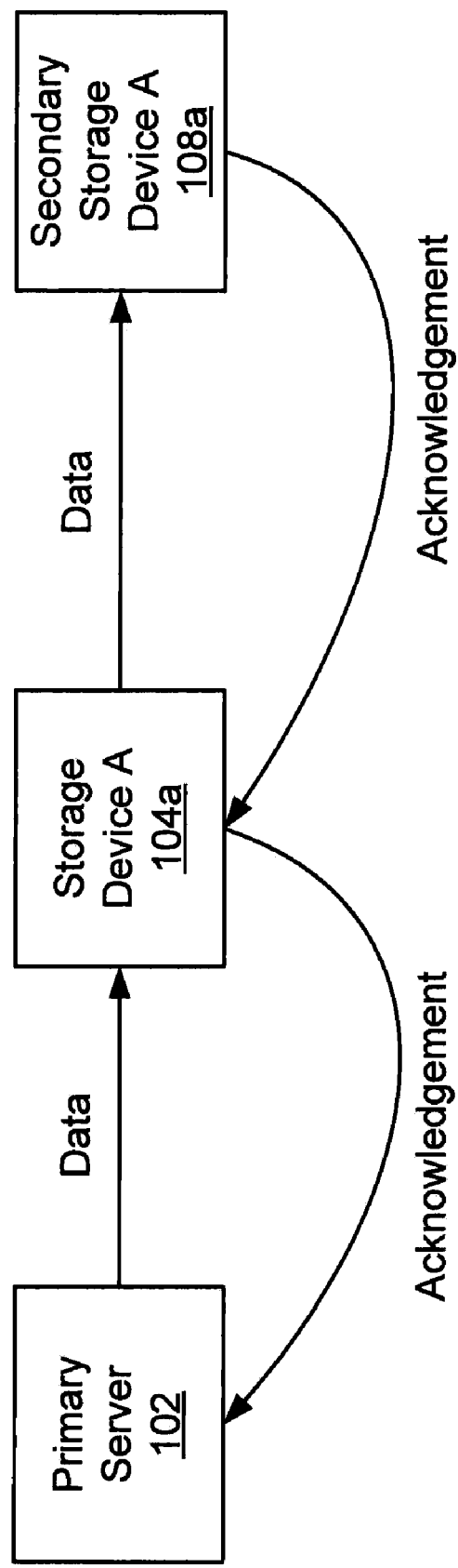
FIG. 2 illustrates an example of a data flow path for the system of FIG. 1.

FIG. 2 illustrates an example of a data flow path for the system 100. In the illustrated example, a data write request is sent from the primary server 102 to the storage device A 104a. Once the storage device A 104a stores the data in the memory, the write operation request is sent to the secondary storage device A 108a. The secondary storage device A 108a performs the write operation, and sends an acknowledgment to the storage device A 104a. The acknowledgement may include, for example, data that indicates that the write operation has been successfully completed. The storage device A 104a sends the received acknowledgement to the primary server 102. Since the write operation is performed on both the storage device A 104 and the secondary storage device B 108a, each of the storage devices should include similar data. The storage devices B and C 104b and 104c are similarly paired to the secondary storage devices B and C 108b and 108c, and operate in a similar manner. Thus, if the storage device A 104a fails, the secondary storage device A 108a may be accessed to continue the tasks run on the primary server 102. Alternatively, if all of the hardware at the primary location 101 (of FIG. 1) became inoperable; the processing tasks may be performed at the secondary location 103.

Figure 3:
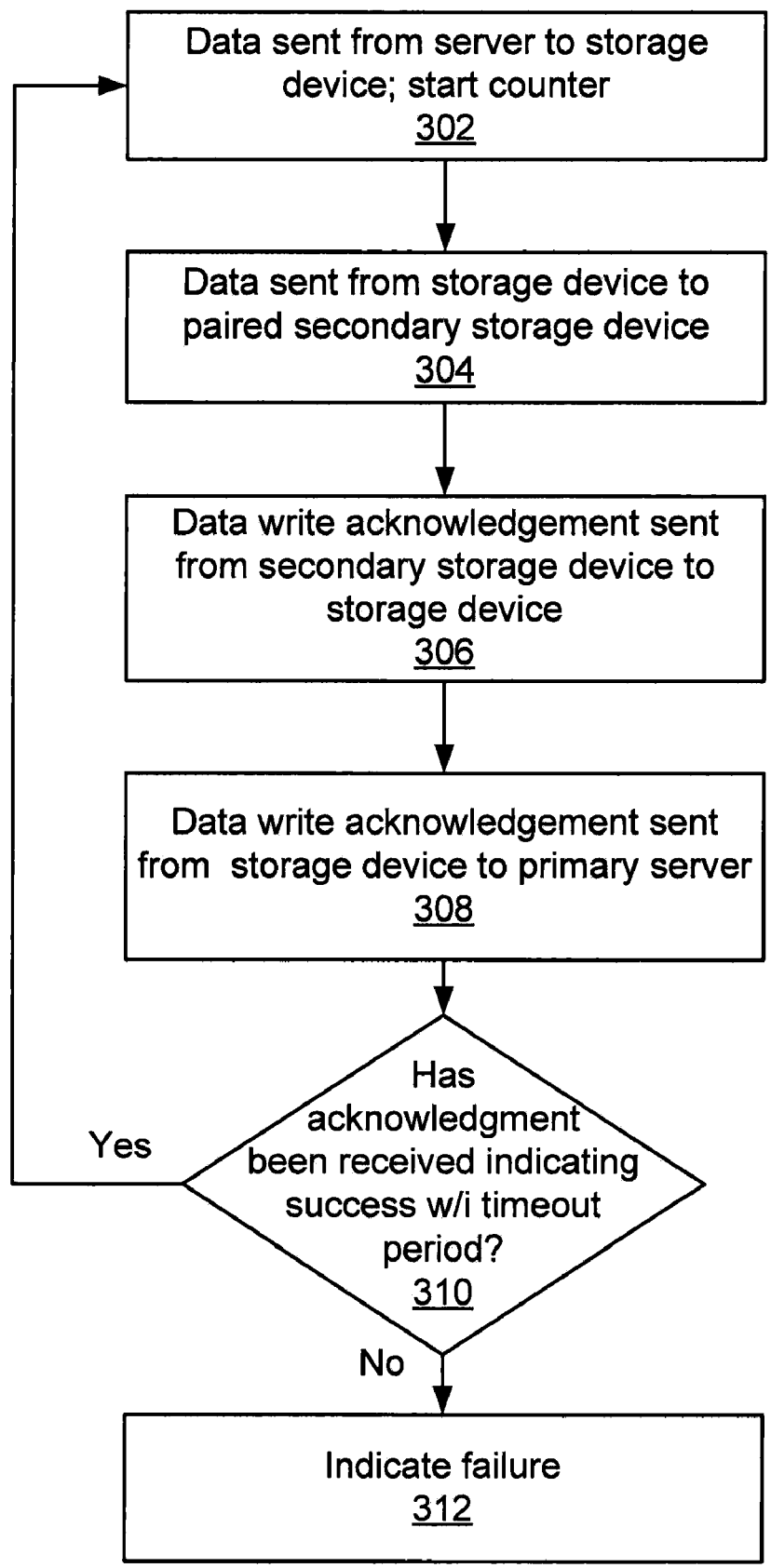
FIG. 3 illustrates an example block diagram of logic used in the system of FIG. 1.

FIG. 3 illustrates an example block diagram of logic used to determine whether a data write operation has been performed on both storage devices. A failure to confirm the performance of the operation may indicate that a communicative link between storage devices has failed, or that the secondary storage device is temporarily or permanently inoperable. In this regard, in block 302, the data write operation is sent from the primary server 102 (of FIG. 1) to a storage device 104 and performed in the storage device 104, a counter may be started in the system 100 when the data write operation is sent to the storage device 104. The write operation is sent to the paired secondary storage device 108 and performed in the secondary storage device 108 in block 304. In block 306, a write acknowledgement message is sent from the secondary storage device 108 to the storage device 104. In block 308, the write acknowledgment is sent from the storage device 104 to the primary server 102. If the counter reaches a threshold prior to the receipt of the write acknowledgement by the primary server 102 in block 310, a failure is indicated in block 312.

The failure may indicate, for example, that a communicative link between the storage device 104 and the paired secondary storage device 108 has failed, or that the secondary storage device 108 cannot perform the write operation due to a temporary or permanent hardware, software, communications, or associated system failure. The indication of a failure of a secondary storage device 108 may also be indicative of a larger system failure. For example, the failure to receive an acknowledgment from the secondary storage device 108 may indicate that the communicative links (e.g. fiber optic lines) between the primary location 101 and the secondary location 103 have been disconnected, or the hardware in the secondary location 103 has been damaged, and cannot operate. It is desirable to differentiate between, for example, a failure of a single secondary storage device 108 and a larger scale system failure.

Figure 4:
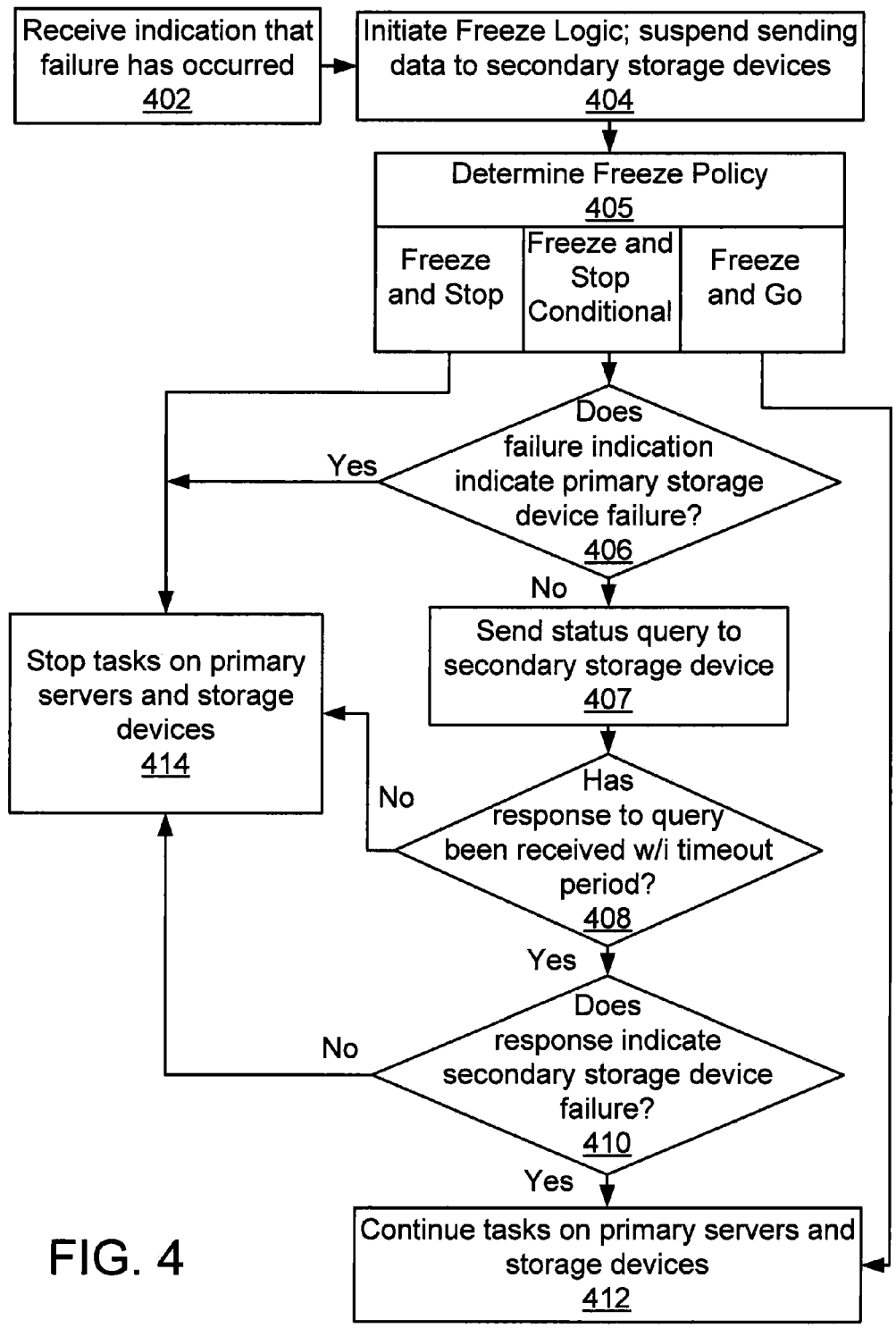
FIG. 4 illustrates an exemplary embodiment of a block diagram illustrating the logic used in the event of a failure indication in the system of FIG. 1.

In the event of a hardware, software, or communications failure, the system 100 may take actions to preserve the integrity of the data. FIG. 4 illustrates an exemplary embodiment of a block diagram illustrating the logic used in the event of a failure indication.

In this regard, referring to FIG. 4, in block 402 an indication of a failure is received. "Freeze logic" is initiated in block 404. The freeze logic suspends sending data write operations from the storage devices 104 (of FIG. 1) to the paired secondary storage devices 108. In block 405, the freeze policy for the system 100 is determined. The freeze policy may be set by a user depending on the user's preferences. The "Freeze Stop" policy stops the data processing tasks in the primary server 102, and stops write operations from being sent to and stored in the storage devices 104. The Freeze Stop policy is useful for users who, for example, prioritize data redundancy between the storage devices 104 and the secondary storage devices 108. Thus, the similarity of the data in the paired devices is maintained at the expense of stopping processing tasks. The Freeze and Go policy allows the continuation of processing tasks and write operations in the storage devices 104, even though the write operations are not performed in the paired secondary storage devices 108. The processing tasks continue, however the write operations are performed in the storage devices 104 at the expense of losing the similarity of the data stored in the paired storage devices 104 and 108.

In some instances, a failure indication may be caused by a failure of a secondary storage device 108, but the system in the secondary location 103 may be operable. For example, the secondary storage device 108 may fail and perform a temporary reboot of the storage device 108. If a write operation is sent to the secondary storage device 108, failure indication may occur since the secondary storage device 108 may not be able to receive and process write operations, or send acknowledgment messages to the paired storage device 104 during the reboot. The "Freeze and Stop Conditional" policy may be selected by a user to differentiate between a temporary delay in performing write operations in a secondary storage device 108 (a failure of the secondary storage device 108) and a failure of the system in the secondary location 103 (e.g., loss of communicative links between the locations 101 and 103, or damage to the hardware in the secondary location 103). In this regard, in block 406, a status query is sent to the affected device, and a counter is started. (An affected device includes a secondary storage device 108 that does not send an acknowledgement following the receipt of a write operation request.) In block 408, if a response to the query is not received from the affected device within a threshold timeout period, processing and write tasks on the primary servers and the storage devices 104 are stopped in block 414. In block 410, if a response is received within the threshold timeout period, the query response is processed to determine the cause of the failure indication. (For example, the query response may include an indication that the affected secondary storage device 108 is performing a reboot, which indicates a failure in the secondary storage device 108, however does not indicate that the system in the location 103 has failed.) If the response indicates a failure of the secondary storage device 108, processing and write tasks may be continued on the primary server 102 and storage devices 104. If the query response does not indicate a failure of the secondary storage device 108, processing and write tasks are stopped in block 414.

The Freeze and Stop Conditional logic described above, allows processing tasks to be performed after a freeze of the system, which suspends sending data write requests to the secondary storage devices 108 if one or more of a set of pre-determined allowable secondary storage device 108 failures occurs, and stops processing tasks if a failure indication is received due to an unforeseen or undetermined cause or event.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks. The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A method for controlling a data system containing a server, a primary data storage device and a secondary data storage device, the method comprising:
   receiving a failure indication indicating that a data operation has failed in the secondary data storage device;
   suspending sending of data operations to the secondary data storage device from a primary data storage device;
   determining a failure policy set by a user; and
   initiating a first policy responsive to determining that the user has set the first policy, the first policy including:
      determining whether the failure indication indicates a failure of the primary data storage device;
      sending a status query to the secondary data storage device responsive to determining that the failure indication does not indicate a failure of the primary data storage device;
      determining whether a response to the status query has been received from the secondary data storage device;
      determining whether the response to the status query indicates a failure of the secondary data storage device responsive to determining that the response to the status query has been received from the secondary data storage device; and
      continuing processing tasks on the server and data operations on the primary data storage device responsive to determining that the response to the status query indicates a failure of the secondary data storage device.

2. The method of claim 1, wherein the first policy further includes suspending processing tasks on the server and data operations on the primary data storage device responsive to determining that the response to the status query does not indicate a failure of the secondary data storage device.

3. The method of claim 1, wherein the first policy further includes suspending processing tasks on the server and data operations on the primary data storage device responsive to determining that a response to the status query has not been received from the secondary data storage device.

4. The method of claim 1, wherein the first policy further includes suspending processing tasks on the server and data operations on the primary data storage device responsive to determining that a response to the status query has not been received from the secondary data storage device within a first time threshold.

5. The method of claim 1, wherein the first policy further includes suspending processing tasks on the server and data operations on the primary data storage device responsive to determining that the failure indication indicates a failure of the primary data storage device.

6. The method of claim 1, wherein the method further includes initiating a second policy responsive to determining that the user has set the second policy, the second policy including suspending processing tasks on the server and data operations on the primary data storage device.

7. The method of claim 1, wherein the method further includes initiating a third policy responsive to determining that the user has set the third policy, the third policy including continuing processing tasks on a server and data operations on the primary data storage device.

8. The method of claim 1, wherein the response to the status query includes data indicating a type of failure of the secondary data storage device.

9. The method of claim 1, wherein the method includes:
   sending a data operation from the server to the primary data storage device;
   sending the data operation from the primary data storage device to the secondary data storage device;
   sending an acknowledgement from the secondary data storage device to the primary data storage device;
   sending the acknowledgment from the primary data storage device to the server;
   determining whether the acknowledgment was received by the server within a predetermined time threshold; and
   sending the failure indication responsive to determining that the acknowledgment was not received by the server within the second time threshold.

10. A data system including:
    a primary data storage device;
    a secondary data storage device communicatively linked to the primary data storage device; and
    a processor communicatively linked to the primary data storage device, the processor operative to receive an indication that a data operation has failed in the secondary data storage device, suspend data operations sent to the secondary data storage device from a primary data storage device, determine a failure policy set by a user, and initiate a first policy responsive to determining that the user has set the first policy, the first policy including determining whether the failure indication indicates a failure of the primary data storage device, sending a status query to the secondary data storage device responsive to determining that the failure indication does not indicate a failure of the primary data storage device, determining whether a response to the status query has been received from the secondary data storage device, determining whether the response to the status query indicates a failure of the secondary data storage device responsive to determining that the response to the status query has been received from the secondary data storage device, and continuing processing tasks on a server and data operations on the primary data storage device responsive to determining that the response to the status query indicates a failure of the secondary data storage device.

11. The system of claim 10, wherein the first policy further includes suspending processing tasks on the processor and data operations on the primary data storage device responsive to determining that the response to the status query does not indicate a failure of the secondary data storage device.

12. The system of claim 10, wherein the first policy further includes suspending processing tasks on the processor and data operations on the primary data storage device responsive to determining that a response to the status query has not been received from the secondary data storage device.

13. The system of claim 10, wherein the first policy further includes suspending processing tasks on the processor and data operations on the primary data storage device responsive to determining that a response to the status query has not been received from the secondary data storage device within a first time threshold.

14. The system of claim 10, wherein the processor is further operative to initiate a second policy responsive to determining that the user has set the second policy, the second policy including suspending processing tasks on the processor and data operations on the primary data storage device.

15. The system of claim 10, wherein the processor is further operative to initiate a third policy responsive to determining that the user has set the third policy, the third policy including continuing processing tasks on the processor and data operations on the primary data storage device.

16. The system of claim 10, wherein the determining whether the response to the status query includes data indicating a type of failure of the secondary data storage device.

17. The system of claim 10, wherein the processor is further operative to:
   sending a data operation from the processor to the primary data storage device;
   sending the data operation from the primary data storage device to the secondary data storage device;
   sending an acknowledgement from the secondary data storage device to the primary data storage device;
   sending the acknowledgment from the primary data storage device to the processor;
   determining whether the acknowledgment was received by the processor within a predetermined time threshold; and
   sending the failure indication responsive to determining that the acknowledgment was not received by the processor within the predetermined time threshold.

18. A non-transitory computer readable storage medium for storing instructions including the steps of:
   receiving an indication that a data operation has failed in a primary data storage device;
   suspending data operations sent to the primary data storage device from a secondary data storage device;
   determining a failure policy set by a user; and
   initiating a first policy responsive to determining that the user has set the first policy, the first policy including:
      determining whether the failure indication indicates a failure of the secondary data storage device;
      sending a status query to the primary data storage device responsive to determining that the failure indication does not indicate a failure of the secondary data storage device;
      determining whether a response to the status query has been received from the primary data storage device;
      determining whether the response to the status query indicates a failure of the primary data storage device responsive to determining that the response to the status query has been received from the primary data storage device; and
      continuing processing tasks on the server and data operations on the secondary data storage device responsive to determining that the response to the status query indicates a failure of the primary data storage device.

19. The non-transitory computer readable storage medium of claim 18, wherein the first policy further includes suspending processing tasks on the server and data operations on the secondary data storage device responsive to determining that the response to the status query does not indicate a failure of the primary data storage device.

20. The non-transitory computer readable storage medium of claim 18, wherein the first policy further includes suspending processing tasks on the server and data operations on the secondary data storage device responsive to determining that a response to the status query has not been received from the primary data storage device.

* * * * *